United States Patent [19]

Lob et al.

[11] 4,362,524
[45] Dec. 7, 1982

[54] BRAKE MECHANISM FOR SNOWMOBILES

[75] Inventors: James P. Lob, Oconomowoc City; Dean J. Tessenske, Horicon City, both of Wis.

[73] Assignee: Deere & Company, Moline, Ill.

[21] Appl. No.: 186,278

[22] Filed: Sep. 11, 1980

[51] Int. Cl.³ .................. F16H 7/00; B62M 27/02
[52] U.S. Cl. .................... 474/88; 180/190; 188/72.3; 188/72.8; 188/72.9
[58] Field of Search .............. 474/88, 146, 158, 171; 192/4 R, 12 BA; 180/190; 188/18 A, 58, 72.8, 59, 72.3, 72.9

[56] References Cited

U.S. PATENT DOCUMENTS

| | | | |
|---|---|---|---|
| 2,756,847 | 7/1956 | Puse | 188/72.3 X |
| 3,108,481 | 10/1963 | Westmont | 474/171 X |
| 3,521,718 | 7/1970 | Masaoka | 474/146 X |
| 3,583,534 | 6/1971 | Chaumont | 192/4 R |
| 3,653,273 | 4/1972 | Albertson | 474/88 X |
| 3,684,045 | 8/1972 | Samuelson | 180/190 |
| 3,985,192 | 10/1976 | Samuelson | 180/190 |
| 4,042,077 | 8/1977 | McCarthy | 188/72.3 X |
| 4,284,176 | 8/1981 | Haraikawa | 188/72.3 X |

Primary Examiner—Nile C. Byers, Jr.

[57] ABSTRACT

A brake mechanism particularly suited for snowmobile applications wherein an engine drives a primary clutch which is in belted communication with a secondary clutch mounted to secondary clutch shaft, the secondary clutch shaft has a brake disc fixably mounted thereon and has a radial extension into a brake carrier. The brake carrier is slidable on a chain housing having a pair of brake plates including brake pads suspended between opposing carrier walls. By causing one brake pad to contact one side of the brake disc, the carrier housing is moved to bring the other brake pad into contact with the other side of the brake disc.

3 Claims, 3 Drawing Figures

BRAKE MECHANISM FOR SNOWMOBILES

BACKGROUND OF THE INVENTION

This invention relates generally to braking systems for light motor vehicles and, more particularly, to snowmobile braking systems of the disc type.

It is known to use disc type braking systems on snowmobiles where the brake disc is keyed to a shaft for limited axial float between two brake pads. During brake actuation, one brake pad is held stationary while the other brake pad is activated to move against the brake disc forcing contact between both brake pads and disc. As a result of this ability of the brake disc to float on the shaft, periodic contact between the brake pads and brake disc within the brake pad housing when the brake is disengaged creates a ringing or chattering noise disconcerting to the snowmobile operator. In addition, the brake disc can become loose due to key wear which can eventually result in a total loss of vehicle braking capacity.

SUMMARY OF THE INVENTION

It is therefore an objective of the present invention to disclose a braking system which eliminates the production of brake noise. A further objective of the present invention is a braking system which is more reliable.

A snowmobile engine drives a primary clutch which is in belted communication with a secondary clutch mounted to a secondary clutch shaft at one end. The secondary clutch shaft is rotatably supported by the snowmobile frame extending transversely thereto having the other end entered into a chain case. On the other end of the secondary clutch shaft within the chain case is mounted a sprocket wheel which is placed in chain communication with a second sprocket wheel mounted to a drive shaft extending parallel to the secondary clutch shaft between the frame walls of the snowmobile. The drive shaft has interspersed along its length a plurality of belt drive sprockets. Along the secondary clutch shaft is fixably mounted a brake disc. A brake carrier is mounted at the top of the chain case such that the brake disc is between the brake pads. For braking application, one brake pad is biased against the brake disc causing the carrier to move in an opposing direction causing the second brake pad to contact with the opposite side of the brake disc resulting in application of the snowmobile brakes. Upon release of the brake disc, biasing springs bias the pads and carrier away from the brake disc.

DETAILED DESCRIPTION OF THE PREFERRED EMBODIMENT

Figure 1:
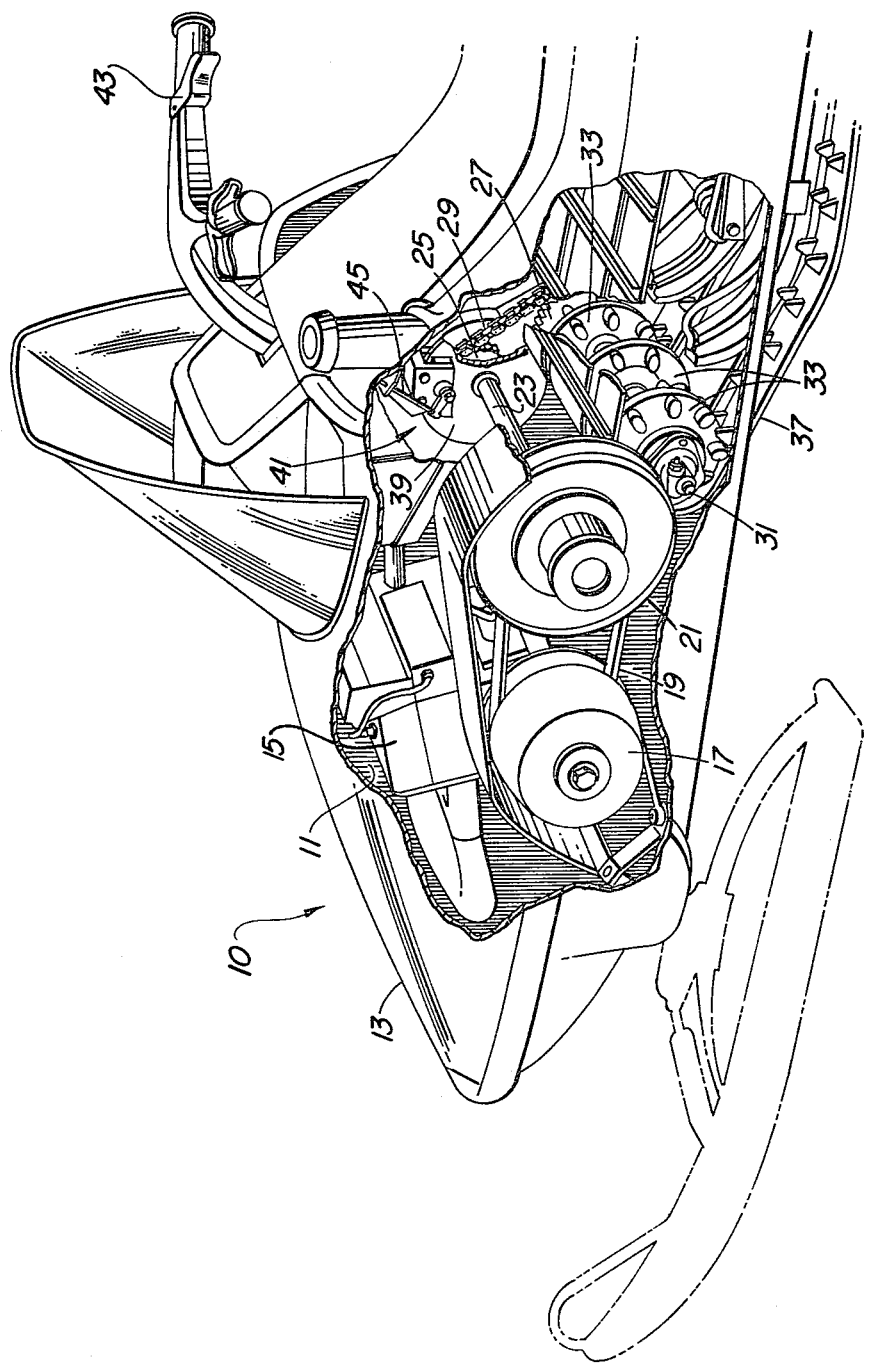
FIG. 1 is a partial side elevational view of a snowmobile, portions there are broken away and portions there are shown in sections.
Figure 2:
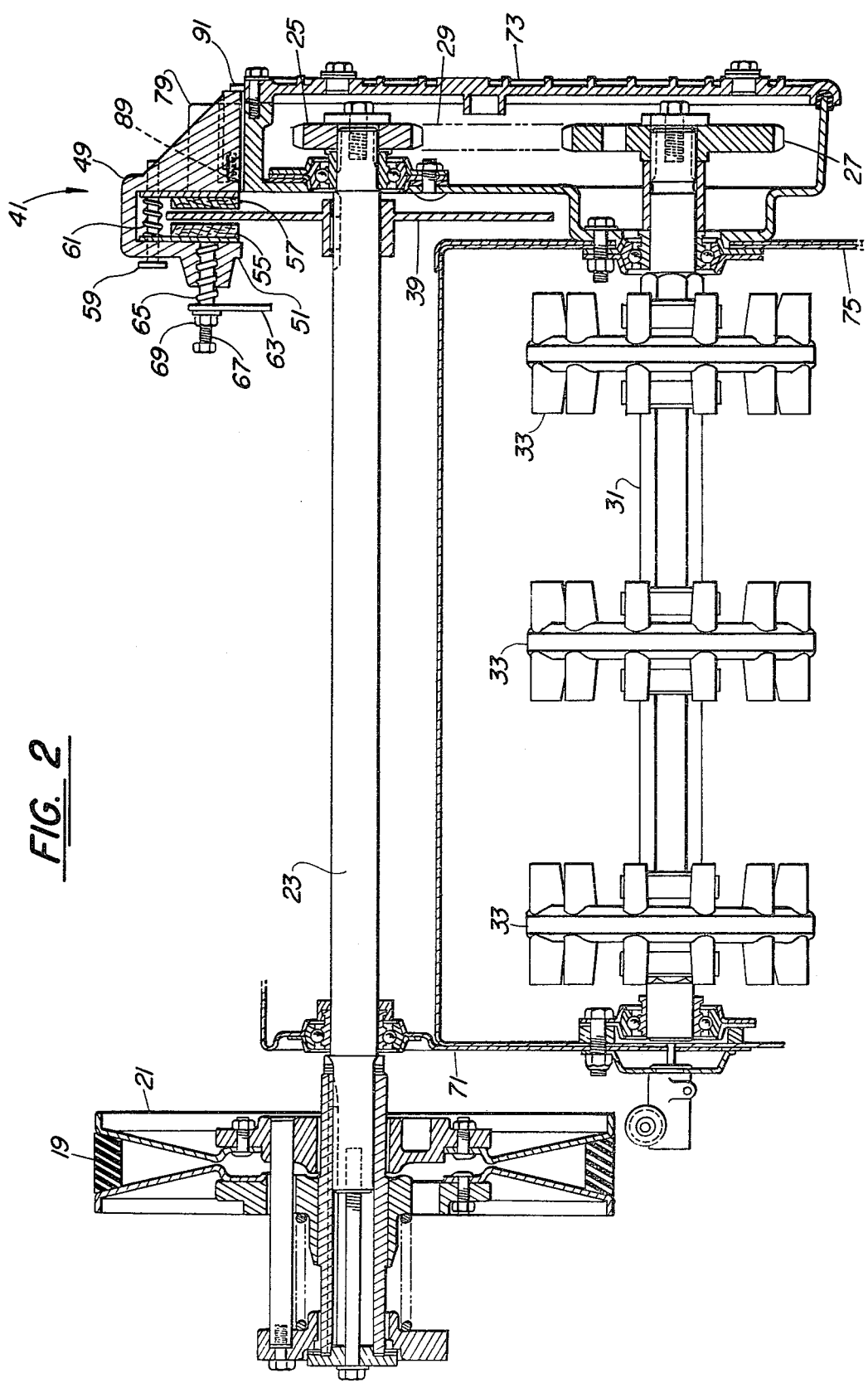
FIG. 2 is a sectional view of a snowmobile drive.

Referring to FIGS. 1 and 2, a snowmobile 10 has a forwardly located engine compartment 11 covered by a hood 13. An engine 15, fixably mounted by any conventional means, is located in the engine compartment 11 and drives a conventional primary clutch 17. An endless belt 19 communicates the primary clutch 17 with a conventional secondary clutch 21. The secondary clutch 21 is fixably mounted to a secondary clutch shaft 23 to transmit power to a wheel sprocket 25 which is in communication with a second wheel sprocket 27 via a mating chain 29. The second wheel sprocket 27 is mounted to one end of a drive shaft 31 which has a plurality of track drive wheels 33. The track drive wheels 33 are in driving communication with an endless drive belt 37. The secondary clutch shaft 23 also has fixedly mounted thereon a brake disc 39 which has a radial extension into a disc brake assembly 41 operated by a hand grip 43 in communication with the brake assembly 41 by cable 45 in a conventional manner.

Figure 3:
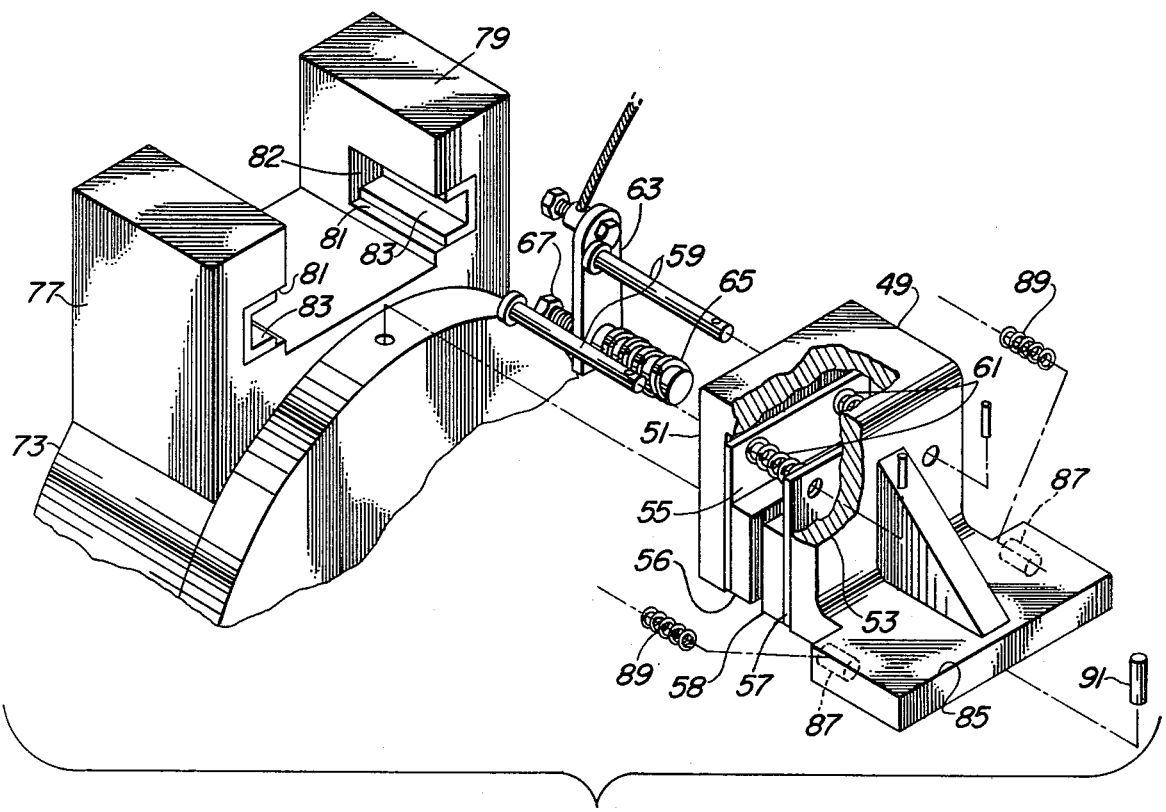
FIG. 3 is an exploited view of a brake carrier assembly in accordance with the present invention.

Referring to FIGS. 2 and 3, the brake assembly 41 includes a carrier housing 49 having a generally U-shaped section including opposing side walls 51 and 53. A pair of brake plates 55 and 57, having brake pads 56 and 58 bonded thereto, are suspended in the carrier housing 49 between walls 51 and 53 supported by pins 59 which extend through the carrier housing 49 such that pads 56 and 59 are in parallel and opposite alignment. Each pin 59 has a spring 61 placed therearound between the brake plates 55 and 57 to bias the brake plates away from each other. A lever 63 having a travel tread stem 65 is received in a mating threaded through bore in wall 57 of carrier housing 49 aligned to abut the rear face of plate 55. An adjusting screw 67 having an adjusting nut 69 is received by lever 63 journeying into a portion lever stem 65.

The secondary clutch shaft 23 is rotatably supported in the vehicle frame wall 71 and a chain housing 73, the chain housing 73 being fixably mounted by any conventional means to vehicle frame wall 75. The vehicle frame walls 71 and 75 also rotatably support drive shaft 31. The chain housing 73 has a pair of vertically extending opposite walls 77 and 79 at the top of the housing. Each wall 77 and 79 has a slot 81 closed at one end by end wall 82. A slide material 83 having a generally U-shaped cross section is pressed into each slot 81 extending generally through the length of respective slots 81. The carrier housing 49 included a support plate 85 containing a plurality of holes 87 each containing a spring 89. The carrier support plate 85 is placed having its side edges within slots 81 and side members 83 such that springs 89 are biased against end wall 82. A stop pin 91 is then placed in the chain housing just behind the carrier housing 49 to limit the amount of linear motion of the carrier housing 49 between the end walls 82 and pin 91. The carrier housing 49 thereby assumes a brake disengaged position having a portion of the brake disc 39 between the brake pads 56 and 58 in spaced-apart relation.

In operation, rotation of the lever 63, caused by compression of hand grip 43, causes brake pad 55 to contact one face of disc 39. Because the brake disc is in a fixed location on shaft 23, continued rotation of lever 63 causes the carrier to slide within slots 81 to bring brake pad 57 into contact with the opposite face of brake disc 39, thereby braking the vehicle. When the brake or released springs 89 biases the carrier housing 49 to its original position then springs 61 bias the brake plates 55 and 57 away from brake disc 39.

I claim:

1. In combination, a snowmobile including an engine driving a primary clutch in belted communication with a secondary clutch fixably mounted to a secondary clutch shaft, said secondary clutch shaft rotatably supported within said snowmobile and having a first wheel sprocket fixably mounted at one end, said first wheel sprocket in chained communication with a second wheel sprocket fixably mounted to one end of a drive shaft rotatably supported within said snowmobile, a chain case covering said first and second sprockets, wherein the improvement comprises: a carrier having a first and second side wall aligned opposite to each other and a support plate extending generally perpendicular from said second side wall; a first brake plate including a brake pad fixably mounted thereto; a second brake plate including a brake pad fixably mounted thereto; means for supportably suspending said first and second brake pads between said first and second carrier side wall, said first brake plate being movable toward said second brake plate; biasing means for biasing said first and second brake plates away from each other; a brake disc fixably mounted around said secondary clutch shaft; said chain case having a first and second support wall in opposite spaced-apart alignment, each support wall having cooperatively aligned grooves sized to recieve the side edges of said plate section of said carrier such that a portion of said brake disc is between said brake plates in spaced-apart relationship, said carrier being slidable in said grooves of said chain case; stop means to limit the travel of said carrier in said grooves; biasing means to bias said carrier and said brake plates in a brake release condition away from said brake disc; and actuator means for moving said first brake pad against one side of said brake disc and causing said carrier to slide in said groove to cause said second brake pads to contact the other side of said disc.

2. A brake mechanism including a rotatable brake disc comprising:

(a) a carrier housing having opposingly aligned side walls;

(b) a plurality of brake plates each including a brake pad;

(c) first means for supporting said brake plate between said side walls of said carrier in opposing alignment and having a first of said brake plate biased away from a said second of said brake plates, said first brake plate to be movable in the direction of said second brake plate;

(d) second means for supporting said carrier housing such that a portion of said brake disc is between said first and second brake plate opposite said brake pads in spaced-apart alignment, said second means to allow said carrier to slide linearly and perpendicularly to said brake disc to assume a brake release position or a brake applied position;

(e) third means for causing said first brake pad of said first brake plate to move and assume braking contact with one side of said brake disc and causing said carrier to slide, bringing said second brake pad of said second brake plate into braking contact with the other side of said brake disc; and (f) fourth means to bias said carrier and second brake plate away from said brake disc when said braking contact is to be released.

3. A brake mechanism as claimed in claim 2 wherein said first means comprises:

(a) at least one pin extends through said side walls and said first and second brake plates; and (b) spring placed around said pin between said brake plates.

* * * * *